(12) United States Patent
Kneckt et al.

(10) Patent No.: US 10,959,174 B2
(45) Date of Patent: Mar. 23, 2021

(54) WAKE-UP RADIO WITH URGENT-DATA CRITERION

(71) Applicant: Apple Inc., Cupertino, CA (US)

(72) Inventors: Jarkko L. Kneckt, Los Gatos, CA (US); Yong Liu, Campbell, CA (US); Su Khiong Yong, Palo Alto, CA (US); Christiaan A. Hartman, Hartman, CA (US); Guoqing Li, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 16/113,550

(22) Filed: Aug. 27, 2018

(65) Prior Publication Data
US 2019/0075521 A1 Mar. 7, 2019

Related U.S. Application Data

(60) Provisional application No. 62/553,805, filed on Sep. 2, 2017.

(51) Int. Cl.
*H04W 52/02* (2009.01)
*H04W 84/12* (2009.01)

(52) U.S. Cl.
CPC ... *H04W 52/0229* (2013.01); *H04W 52/0216* (2013.01); *H04W 52/0219* (2013.01); *H04W 52/0258* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 6,973,052 B2 | 12/2005 | Wang | |
| 7,457,973 B2 | 11/2008 | Liu | |
| 7,477,616 B2 | 1/2009 | Wang | |
| 8,958,433 B2 | 2/2015 | Kamath | |

(Continued)

FOREIGN PATENT DOCUMENTS

| | | |
|---|---|---|
| EP | 3 413 636 A1 | 12/2018 |
| WO | WO201870820 A1 | 4/2018 |

OTHER PUBLICATIONS

Extended European Search Report, European Patent Application No. 182060525, dated Apr. 10, 2019, eight pages.

(Continued)

*Primary Examiner* — Jenkey Van

(74) *Attorney, Agent, or Firm* — Kowert, Hood, Munyon, Rankin & Goetzel, P.C.

(57) ABSTRACT

An interface circuit in an electronic device (such as an access point) may receive a wake-up-radio (WUR)-setup request associated with a recipient electronic device, where the WUR-setup request specifies one or more proposed data criteria or wake-up criteria that indicate when a wake-up frame is to be transmitted to the recipient electronic device. In response, the electronic device may determine one or more data criteria (or wake-up criteria) for use based at least in part on the one or more proposed data criteria. Then, the interface circuit may provide a WUR-setup response intended for the recipient electronic device, where the WUR-setup response indicates acceptance of the one or more proposed data criteria for use as the one or more data criteria or a proposed modification of at least one of the one or more proposed data criteria.

20 Claims, 14 Drawing Sheets

(56) References Cited

U.S. PATENT DOCUMENTS

| | | |
|---|---|---|
| 9,955,333 B2 | 4/2018 | Benoit |
| 2009/0196212 A1* | 8/2009 | Wentink ............ H04W 52/0235 370/311 |
| 2010/0069126 A1* | 3/2010 | Wang ................... H04L 67/125 455/574 |
| 2013/0155930 A1 | 6/2013 | Chu et al. |
| 2014/0161010 A1* | 6/2014 | Merlin .............. H04W 52/0235 370/311 |
| 2016/0105829 A1 | 4/2016 | Wentink |
| 2016/0219512 A1 | 7/2016 | Asterjadhi et al. |
| 2016/0374019 A1* | 12/2016 | Park ....................... H04W 8/24 |
| 2017/0280498 A1* | 9/2017 | Min ...................... H04L 5/0053 |
| 2017/0332327 A1 | 11/2017 | Fang et al. |
| 2018/0041961 A1* | 2/2018 | Huang ............. H04W 52/0216 |
| 2018/0049131 A1* | 2/2018 | Huang ............. H04W 52/0248 |
| 2018/0288703 A1* | 10/2018 | Sun .................. H04W 52/0235 |
| 2018/0302923 A1 | 10/2018 | Patil |
| 2018/0317172 A1* | 11/2018 | Lepp .................... H04W 68/02 |
| 2019/0028967 A1* | 1/2019 | Ahn ......................... H04B 7/02 |
| 2019/0159127 A1* | 5/2019 | Son .................. H04W 52/0222 |
| 2019/0182770 A1* | 6/2019 | Li .......................... H04W 8/005 |
| 2019/0191375 A1* | 6/2019 | Cheng ............. H04W 52/0229 |
| 2019/0327679 A1* | 10/2019 | Gupta .............. H04W 52/0229 |
| 2019/0364503 A1* | 11/2019 | Kasslin ................. H04W 52/02 |
| 2020/0045636 A1* | 2/2020 | Huang .................... H04L 49/90 |
| 2020/0178178 A1* | 6/2020 | Huang ............. H04W 52/0235 |
| 2020/0196243 A1* | 6/2020 | Kim ...................... H04W 56/00 |

OTHER PUBLICATIONS

European Exam Report for Patent Application No. 18206052.5; dated Oct. 16, 2020; 6 Pages.

* cited by examiner

WAKE-UP RADIO WITH URGENT-DATA CRITERION

CROSS-REFERENCE TO RELATED APPLICATION

This application claims the benefit of U.S. Provisional Application No. 62/553,805, entitled "Wake-Up Radio with Urgent-Data Criterion," by Jarkko L. Kneckt, et al., filed Sep. 2, 2017, the contents of which are hereby incorporated by reference.

This application is related to U.S. Non-Provisional application Ser. No. 16/113,659, entitled "Power-Efficient Communication of Group-Addressed Frames," by Christiaan A. Hartman, filed Aug. 27, 2018, the contents of which are hereby incorporated by reference.

FIELD

The described embodiments relate, generally, to wireless communications among electronic devices, and techniques for specifying one or more urgent-data criteria for when a wake-up radio should wake up or transition a main radio from a lower-power mode to a higher-power mode.

BACKGROUND

Many electronic devices communicate with each other using wireless local area networks (WLANs), such as those based on a communication protocol that is compatible with an IEEE 802.11 standard (which is sometimes referred to as 'Wi-Fi'). However, a radio in an electronic device that communicates using wireless communication in a WLAN may consume a significant amount of power.

In order to address this challenge, a new radio technology called Low Power Wake-Up Radio (LP-WUR) is being considered (in the discussion that follows a LP-WUR is referred to as a 'wake-up radio' or a WUR). The WUR may be a companion to the main Wi-Fi radio in the electronic device. Notably, by using the WUR, the electronic device may turn off its main radio and may selectively wake up the main radio in response to the WUR receiving a WUR packet from an access point. For example, the access point may send the WUR packet when there is a down-link packet for the electronic device.

However, the frequency of wake-up frames can increase the power consumption of the electronic device. In addition, the wake-up frames may increase the transmission overhead.

SUMMARY

A first group of embodiments relates to an electronic device that provides a WUR response. This electronic device may include a node that can be communicatively coupled to an antenna, and an interface circuit communicatively coupled to the node and that communicates with a recipient electronic device. During operation, the interface circuit receives, from the node, a WUR-setup request associated with the recipient electronic device, where the WUR-setup request specifies one or more proposed wake-up criteria that indicate when a wake-up frame is to be transmitted to the recipient electronic device. Then, the interface circuit provide, to the node, a WUR-setup response intended for the recipient electronic device, where the WUR-setup response indicates acceptance of the one or more proposed wake-up criteria as one or more wake-up criteria for use and/or a proposed modification of the one or more proposed wake-up criteria.

Moreover, the electronic device may determine the one or more wake-up criteria that indicate when the wake-up frame is transmitted to the recipient electronic device based at least in part on the one or more proposed wake-up criteria.

Furthermore, the interface circuit may provide, to the node, a wake-up frame intended for the recipient electronic device based at least in part on the one or more wake-up criteria. For example, the wake-up frame may include information specifying at least a subset of the one or more wake-up criteria that were met prior to the interface circuit providing the wake-up frame.

Additionally, the interface circuit may receive, from the node, a second WUR-setup response associated with the recipient electronic device. The second WUR-setup response may indicate acceptance by the recipient electronic device of the proposed modification of the one or more proposed wake-up criteria.

Note that the wake-up frame may indicate that a main radio in the recipient electronic device is to transition from a lower-power mode to a higher-power mode.

In some embodiments, the electronic device includes an access point.

Moreover, the WUR-setup request and the WUR-setup response may be compatible with an IEEE 802.11 communication protocol.

Furthermore, the interface circuit may provide, to the node, a frame that indicates a targeted-wake-up-time (TWT) schedule for the recipient electronic device, where the wake-up frame is used to wake up the recipient electronic device between TWT service periods (SPs) in the TWT schedule. For example, the TWT schedule may include a first TWT SP interval for uplink traffic from the recipient electronic device and a second TWT SP interval for down-link traffic to the recipient electronic device.

Additionally, the one or more wake-up criteria may include at least one of: an amount of buffered data for the recipient electronic device, an amount of buffered data associated with at least a traffic identifier, an amount of buffered data associated with at least an access category, a group address that the recipient electronic device receives, a priority level of buffered data for the recipient electronic device, address information of buffered data for the recipient electronic device, buffered data associated with a threshold number of traffic identifiers for the recipient electronic device, total buffered data in the access point and a threshold buffered data value, buffered data addressed to one or more multicast addresses, a minimum buffering delay, or a maximum buffering delay.

Note that the one or more wake-up criteria may be different for different group addresses.

In some embodiments, the interface circuit provides, to the node, a wake-up frame intended for the recipient electronic device based at least in part on the one or more wake-up criteria, and the wake-up frame is addressed to a group address.

Moreover, the interface circuit may provide, to the node, a wake-up frame intended for the recipient electronic device based at least in part on the one or more wake-up criteria, and the wake-up frame is addressed to the recipient electronic device when the wake-up frame has a predefined urgency.

Other embodiments provide an interface circuit in the electronic device.

Other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the electronic device.

Other embodiments provide a method for providing a WUR response. The method includes at least some of the aforementioned operations performed by the interface circuit in the electronic device.

A second group of embodiments relates to a recipient electronic device that receives a WUR response. This recipient electronic device may include a node that can be communicatively coupled to an antenna, and an interface circuit communicatively coupled to the node and that communicates with an electronic device. The interface circuit may include a main radio and a WUR that at least selectively transitions the main radio from a lower-power mode to a higher-power mode in response to a wake-up frame. During operation, the main radio in the interface circuit provides, to the node, a WUR-setup request intended for the electronic device, where the WUR-setup request specifies one or more proposed wake-up criteria that indicate when the wake-up frame is transmitted to the recipient electronic device. Then, the main radio may receive, from the node, a WUR-setup response associated with the electronic device, where the WUR-setup response indicates acceptance of the one or more proposed wake-up criteria as one or more wake-up criteria for use and/or a proposed modification of the one or more proposed wake-up criteria.

Other embodiments provide an interface circuit in the recipient electronic device.

Other embodiments provide a computer-readable storage medium for use with the interface circuit in the recipient electronic device. When program instructions stored in the computer-readable storage medium are executed by the interface circuit, the program instructions may cause the recipient electronic device to perform at least some of the aforementioned operations of the recipient electronic device.

Other embodiments provide a method for receiving a WUR response. The method includes at least some of the aforementioned operations performed by the main radio in the interface circuit in the recipient electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
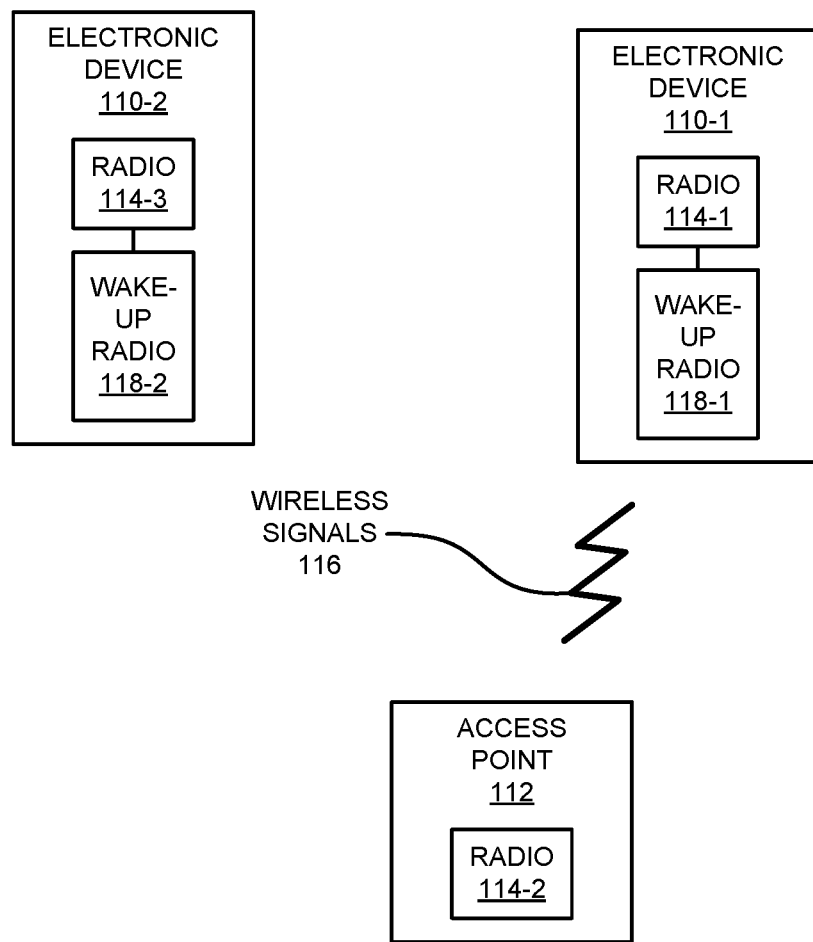
FIG. 1 is a block diagram illustrating an example of electronic devices communicating wirelessly.

An interface circuit in an electronic device (such as an access point) may receive a WUR-setup request associated with a recipient electronic device, where the WUR-setup request specifies one or more proposed data criteria or wake-up criteria that indicate when a wake-up frame is to be transmitted to the recipient electronic device. In response, the electronic device may determine one or more data criteria (or wake-up criteria) for use based at least in part on the one or more proposed data criteria. Then, the interface circuit may provide a WUR-setup response intended for the recipient electronic device, where the WUR-setup response indicates acceptance of the one or more proposed data criteria as the one or more data criteria for use and/or a proposed modification of at least one of the one or more proposed data criteria.

By exchanging information that allows the data criteria to be proposed and accepted, these communication techniques may reduce the number and/or the frequency of wake-up frames. Consequently, the communication techniques may reduce the transmission overhead associated with the wake-up frames. In addition, the communication techniques may reduce the power consumption of the recipient electronic device. Thus, the communication techniques may improve the user experience when using the electronic device or the recipient electronic device, and therefore may increase customer satisfaction and retention.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11BA and/or IEEE 802.11ax, which are used as illustrative examples in the discussion that follows. However, the communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some embodiments, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

As described further below with reference to FIG. 14, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. As illustrated further below with reference to FIGS. 2-4, radio 114-1 may receive wireless signals 116 that are transmitted by radio 114-2. Alternatively, radio 114-1 may transmit wireless signals 116 that are received by radio 114-2. However, as described further below with reference to FIG. 5, radio 114-1 consumes additional power in a higher-power mode. If radio 114-1 remains in the higher-power mode even when it is not transmitting or receiving packets, the power consumption of electronic device 110-1 may be needlessly increased. Consequently, electronic devices 110 may include WURs 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions radio 114-1 from a lower-power mode to the higher-power mode. In some embodiments, electronic device 110-1 may implement multiple different lower-power modes. In some other embodiments, an electronic device 110-1 may implement only one lower-power mode.

As discussed previously, the number or frequency of wake-up frames or wake-up communications may still result in additional power consumption by electronic device 110-1. Moreover, these wake-up frames or wake-up communications may result in unnecessary transmission or communication overhead.

In order to address this challenge, as described further below with reference to FIGS. 2-4 and 9-13, access point 112 may determine one or more wake-up criteria for use with electronic device 110-1 based at least in part on one or more proposed wake-up criteria (e.g., proposed by electronic device 110-1). Notably, electronic device 110-1 may provide or transmit a WUR-setup request to access point 112. This WUR-setup request may specify the one or more proposed wake-up criteria that indicate when a wake-up frame is to be transmitted to electronic device 110-1. In response, access point 112 may determine the one or more wake-up criteria that will be used to determine when the wake-up frame is to be transmitted to electronic device 110-1 based at least in part on the one or more proposed wake-up criteria. Then, access point 112 may provide or transmit a WUR-setup response to electronic device 110-1, where the WUR-setup response indicates acceptance of the one or more proposed wake-up criteria as one or more wake-up criteria to be utilized or indicates a proposed modification to at least one of the one or more proposed wake-up criteria. In some embodiments, electronic device 110-1 may provide or transmit a second WUR-setup response to access point 112. In some instances, the WUR-setup response may indicate both acceptance of one or more proposed wake-up criteria and a proposed modification to at least one of the one or more proposed wake-up criteria. The second WUR-setup response may indicate acceptance by electronic device 110-1 of the proposed modification of the one or more proposed wake-up criteria.

The one or more wake-up criteria may include any/all of: an amount of buffered data for electronic device 110-1, an amount of buffered data associated with at least a traffic identifier (TID), an amount of buffered data associated with at least an access category (AC), a group address that electronic device 110-1 receives, a priority level of buffered data for electronic device 110-1, address information of buffered data for electronic device 110-1, buffered data associated with a threshold number of traffic identifiers for electronic device 110-1, total buffered data in access point 112 and a threshold buffered data value, buffered data addressed to one or more multicast addresses, a minimum buffering delay, and/or a maximum buffering delay. Note that the one or more wake-up criteria may be different for different group addresses.

Moreover, access point 112 may provide or transmit a wake-up frame to electronic device 110-1 based at least in part on the one or more wake-up criteria. For example, the wake-up frame may include information specifying at least a subset of the one or more wake-up criteria that were met prior to access point 112 providing the wake-up frame. Furthermore, access point 112 may provide or transmit a wake-up frame to electronic device 110-1 based at least in part on the one or more wake-up criteria, where the wake-up frame is addressed to a group address. Additionally, access point 112 may provide or transmit a wake-up frame to electronic device 110-1 based at least in part on the one or more wake-up criteria, where the wake-up frame is addressed to electronic device 110-1 when the wake-up frame has a predefined urgency.

In some embodiments, access point 112 may provide or transmit to electronic device 110-1 a frame that indicates a TWT schedule for electronic device 110-1, and a wake-up frame may be used (e.g., by access point 112) to wake up electronic device 110-1 between TWT SPs in the TWT schedule. For example, as described below with reference to FIG. 8, the TWT schedule may include a first TWT SP interval for uplink traffic from electronic device 110-1 and a second TWT SP interval for downlink traffic to electronic device 110-1.

In these ways, the communication techniques may allow electronic devices 110 and access point 112 to communicate efficiently (such as with reduced transmission overhead associated with wake-up packets or frames), while significantly reducing the power consumption associated with radios 114 and WURs 118 in electronic devices 110. These capabilities may improve the user experience when using electronic devices 110.

Note that access point 112 and at least some of electronic devices 110 may be compatible with an IEEE 802.11 standard that includes trigger-based channel access (such as IEEE 802.11ax). However, access point 112 and at least this subset of electronic devices 110 may also communicate with one or more legacy electronic devices that are not compatible with the IEEE 802.11 standard (i.e., that do not use multi-user trigger-based channel access). In some embodiments, at least a subset of electronic devices 110 use multi-user transmission (such as orthogonal frequency division multiple access or OFDMA). For example, radio 114-2 may provide a trigger frame intended for the subset of electronic devices 110. This trigger frame may be provided after a time delay (such as a time delay between, e.g., 10 and 300 ms), so that radio 114-1 has sufficient time to transition to the higher-power mode. Moreover, after radio 118-1 receives a wake-up frame or when there is a TWT SP and radio 114-1 transitions to the higher-power mode, radio 114-1 may provide a group acknowledgment to radio 114-2. For example, radio 114-1 may provide the acknowledgment during an assigned time slot and/or in an assigned channel in the group acknowledgment. However, in some embodiments the one or more electronic devices 110 may individually provide acknowledgments to radio 114-2. Thus, after radio 118-1 receives the wake-up frame and radio 114-1 transitions to the higher-power mode, radio 114-1 (and, more generally, the main radios in the one or more electronic devices 110) may provide an acknowledgment to radio 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
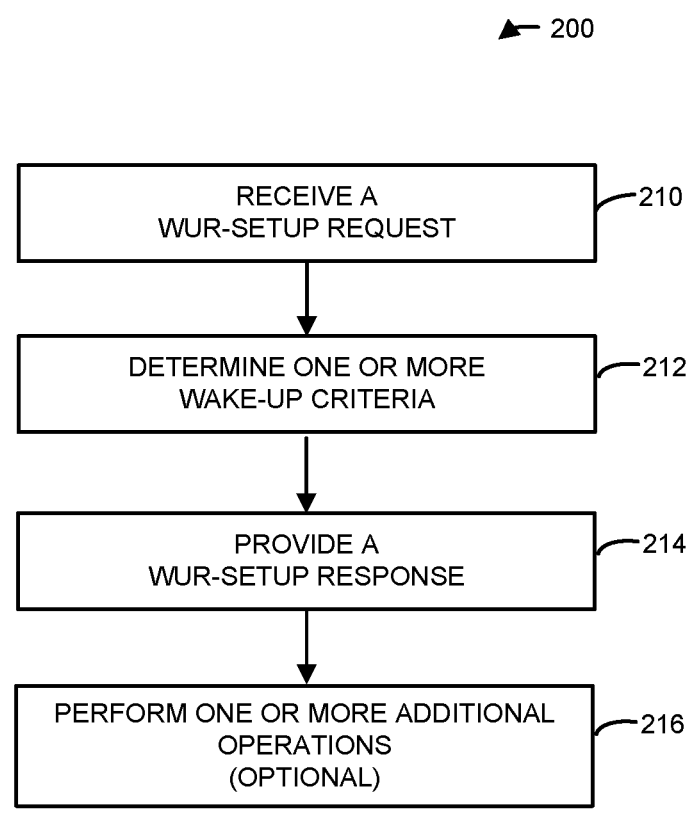
FIG. 2 is a flow diagram illustrating an example of a method for providing a WUR response using one of the electronic devices in FIG. 1.

FIG. 2 presents a flow diagram illustrating an example method 200 for providing a WUR response. This method may be performed by an electronic device, such as an interface circuit in access point 112 in FIG. 1. During operation, the interface circuit may receive a WUR-setup request (operation 210) associated with a recipient electronic device (such as electronic device 110-1 in FIG. 1), where the WUR-setup request specifies one or more proposed wake-up criteria that indicate when a wake-up frame is to be transmitted to the recipient electronic device.

The one or more wake-up criteria may include any/all of: an amount of buffered data for the recipient electronic device, an amount of buffered data associated with at least a TID, an amount of buffered data associated with at least an AC, a group address that the recipient electronic device receives, a priority level of buffered data for the recipient electronic device, address information of buffered data for the recipient electronic device, buffered data associated with a threshold number of traffic identifiers for the recipient electronic device, total buffered data in the access point and a threshold buffered data value, buffered data addressed to one or more multicast addresses, a minimum buffering delay, and/or a maximum buffering delay. Note that the one or more wake-up criteria may be different for different group addresses.

The electronic device may optionally determine the one or more wake-up criteria (operation 212) that indicate when a wake-up frame is transmitted to the recipient electronic device based at least in part on the one or more proposed wake-up criteria.

The interface circuit may provide a WUR-setup response (operation 214) intended for the recipient electronic device, where the WUR-setup response indicates acceptance of one or more proposed wake-up criteria as one or more wake-up criteria to be used (e.g., one or more selected wake-up criteria) and/or a proposed modification of one or more proposed wake-up criteria.

Note that the wake-up frame may indicate that a main radio in the recipient electronic device is to transition from a lower-power mode to a higher-power mode. Moreover, the WUR-setup request and the WUR-setup response may be compatible with an IEEE 802.11 communication protocol.

In some embodiments, the interface circuit optionally performs one or more additional operations (operation 216). For example, the interface circuit may receive a second WUR-setup response associated with the recipient electronic device, where the second WUR-setup response may indicate acceptance by the recipient electronic device of the proposed modification of the one or more proposed wake-up criteria.

Moreover, the integrated circuit may provide a wake-up frame intended for the recipient electronic device based at least in part on the one or more wake-up criteria. For example, the wake-up frame may include information specifying at least a subset of the one or more wake-up criteria that were met prior to the interface circuit providing the wake-up frame. Furthermore, the interface circuit may provide a wake-up frame intended for the recipient electronic device based at least in part on the one or more wake-up criteria, and the wake-up frame is addressed to a group address. Additionally, the interface circuit may provide a wake-up frame intended for the recipient electronic device based at least in part on the one or more wake-up criteria, and the wake-up frame is addressed to the recipient electronic device when the wake-up frame has a predefined urgency.

In some embodiments, the interface circuit may provide a frame that indicates a TWT schedule for the recipient electronic device, where a wake-up frame is used to wake up the recipient electronic device between TWT SPs in the TWT schedule. For example, the TWT schedule may include a first TWT SP interval for uplink traffic from the recipient electronic device and a second TWT SP interval for downlink traffic to the recipient electronic device.

Figure 3:
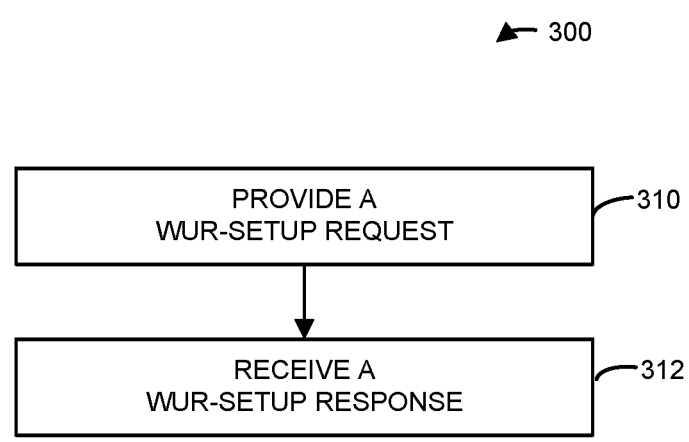
FIG. 3 is a flow diagram illustrating an example of a method for receiving a WUR response using one of the electronic devices in FIG. 1.

FIG. 3 presents a flow diagram illustrating an example method 300 for receiving a WUR response. This method may be performed by a recipient electronic device, such as an interface circuit in electronic device 110-1 in FIG. 1. This interface circuit may include a WUR and a main radio. During operation, the main radio in the interface circuit may provide a WUR-setup request (operation 310) intended for the electronic device, where the WUR-setup request specifies one or more proposed wake-up criteria that indicate when a wake-up frame is to be transmitted to the recipient electronic device. Then, the main radio may receive, from the node, a WUR-setup response (operation 312) associated with the electronic device, where the WUR-setup response indicates acceptance of one or more proposed wake-up criteria as one or more wake-up criteria to be used and/or a proposed modification of one or more proposed wake-up criteria.

In some embodiments of methods 200 (FIG. 2) and/or 300, there may be additional or fewer operations. Further, one or more different operations may be included. Moreover, the order of the operations may be changed, and/or two or more operations may be combined into a single operation or performed at least partially in parallel.

In some embodiments, at least some of the operations in methods 200 (FIG. 2) and/or 300 are performed by an interface circuit in the electronic device. For example, at least some of the operations may be performed by firmware executed by an interface circuit, such as firmware associated with a media access control (MAC) layer, as well as one or more circuits in a physical layer in the interface circuit.

Figure 4:
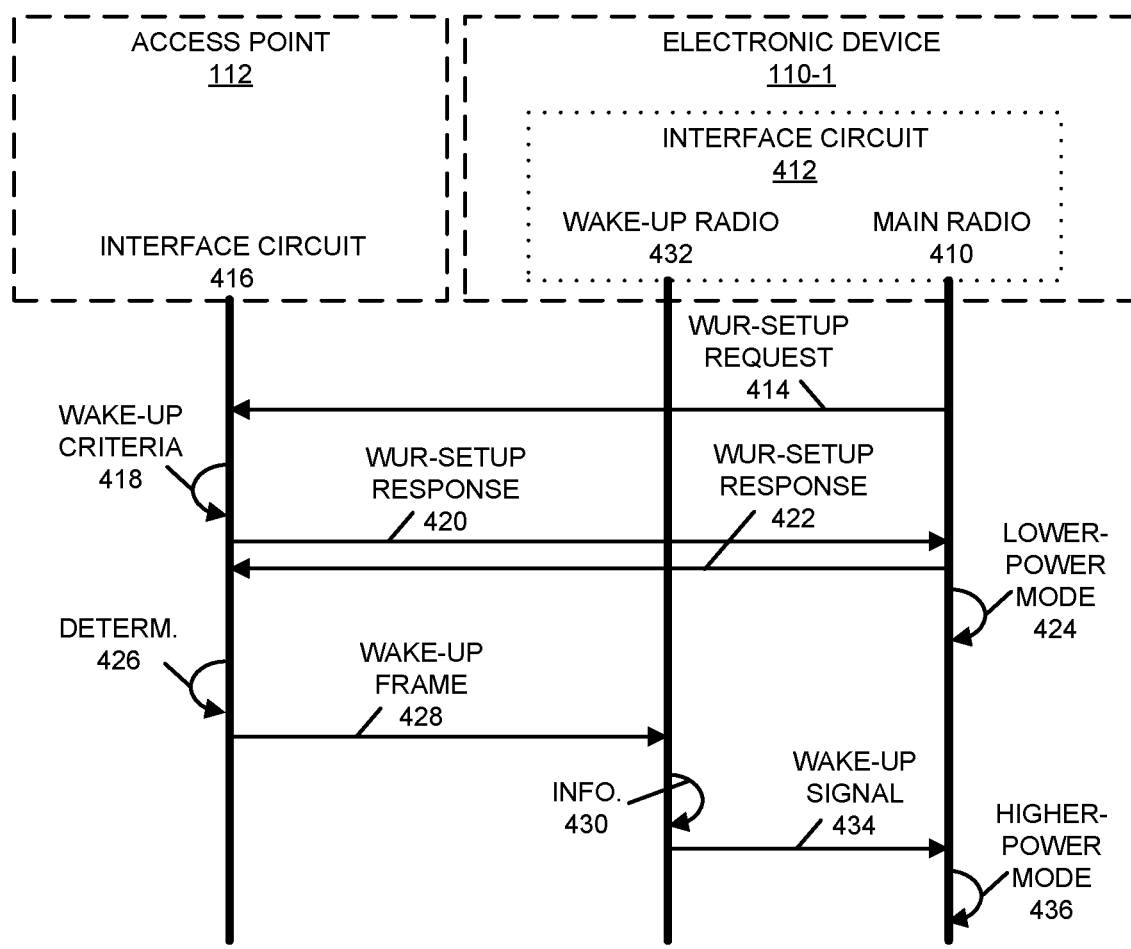
FIG. 4 is a flow diagram illustrating an example of communication between electronic devices, such as the electronic devices of FIG. 1.

The communication techniques are further illustrated in FIG. 4, which presents a flow diagram illustrating an example of communication between electronic device 110-1 and access point 112. After associating with access point 112, main radio 410 in interface circuit 412 in electronic device 110-1 may provide a WUR-setup request 414 to access point 112. This WUR-setup request may specify one or more proposed wake-up criteria that indicate when a wake-up frame is to be transmitted to electronic device 110-1.

After receiving the WUR-setup request 414, interface circuit 416 in access point 112 may optionally determine one or more wake-up criteria 418 that indicate when the wake-up frame is to be transmitted to electronic device 110-1 based at least in part on the one or more proposed wake-up criteria. Then, interface circuit 416 may provide a WUR-setup response 420 to electronic device 110-1. This WUR-setup response may indicate acceptance of one or more proposed wake-up criteria as one or more wake-up criteria to be used (e.g., selected wake-up criteria) and/or a proposed modification of one or more proposed wake-up criteria.

After receiving the WUR-setup response 420, main radio 410 may provide a WUR-setup response 422 to access point 112. The WUR-setup response 422 may indicate acceptance by the recipient electronic device of the proposed modification of one or more proposed wake-up criteria. Next, main radio 410 may transition to a lower-power mode 424. The main radio 410 may implement a single lower-power mode or may select one of multiple lower-power modes.

Moreover, interface circuit 416 may determine 426 to provide wake-up frame 428 for WUR 430 (such as WUR 118-1) in interface circuit 412. For example, interface circuit 416 may determine 426 to provide wake-up frame 428 when there is downlink traffic (such as data associated with a service) for electronic device 110-1, e.g., based at least in part on the one or more wake-up criteria 418.

After receiving wake-up frame 428, WUR 430 may extract and analyze information 432. Then, WUR 430 may perform a remedial action. For example, WUR 430 may provide, to main radio 410, a wake-up signal 434 that transitions main radio 410 from lower-power mode 424 to a higher-power mode 436, e.g., based at least in part on information 432.

In some embodiments, there may be a TWT schedule for electronic device 110-1. Notably, before transitioning to the lower-power mode 424, main radio 410 may instruct WUR 430 in interface circuit 412 to transition to a lower-power mode. Subsequently, based at least in part on the TWT schedule, WUR 430 may transition to a higher-power mode in order to receive a schedule wake-up frame during a TWT SP. In these embodiments, wake-up frame 428 may be used to wake up WUR 430 and, selectively, main radio 410 between TWT SPs in the TWT schedule.

While communication between the components in FIG. 4 is illustrated with unilateral or bilateral communication (e.g., lines having a single arrow or dual arrows), in general a given communication operation may be unilateral or bilateral.

In some embodiments of the WUR technology, the communication techniques are used to determine, modify, and/or exchange one or more wake-up criteria for a recipient electronic device. The one or more wake-up criteria may reduce the number or frequency of wake-up frames, and thus may reduce the power consumption of a recipient electronic device and the transmission overhead associated with the wake-up frames.

Based at least in part on the one or more wake-up criteria, an electronic device (such as access point 112 in FIG. 1) may provide a wake-up frame to a recipient electronic device (such as electronic device 110-1 in FIG. 1). A WUR in the recipient electronic device may receive the wake-up frame. Moreover, based at least in part on the information included in the wake-up frame, the WUR may selectively transition a main radio (or other radio) in the recipient electronic device from a lower-power mode to a higher-power mode.

Figure 5:
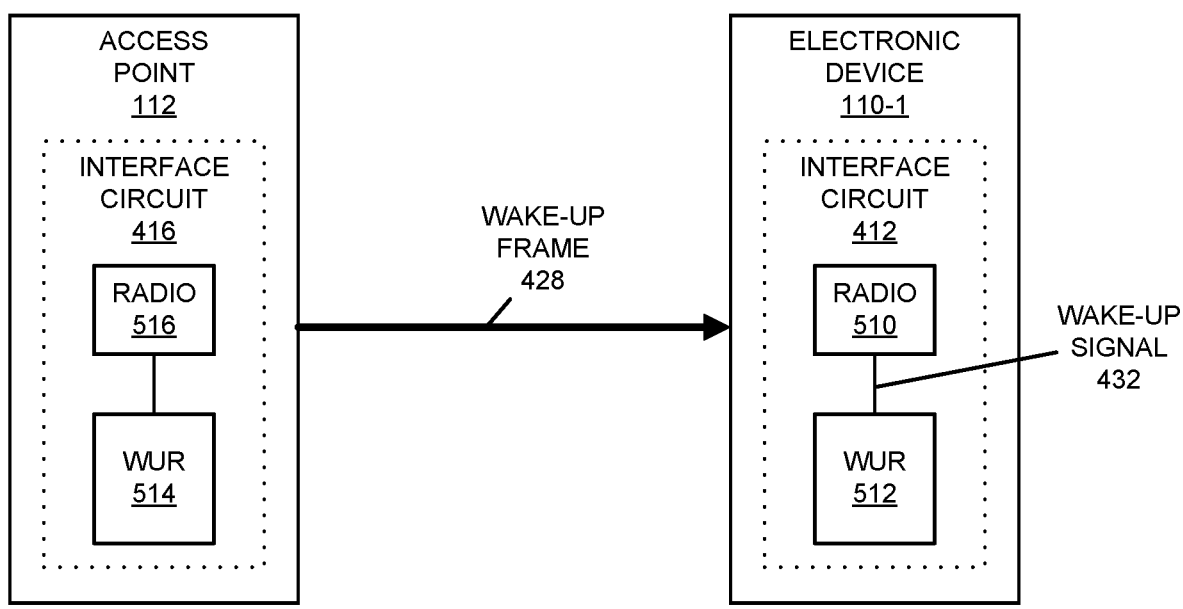
FIG. 5 is a drawing illustrating an example interface circuit in one of the electronic devices in FIG. 1.

As shown in FIG. 5, which presents a drawing illustrating an example of an interface circuit 412 in electronic device 110-1, a WUR 512 (such as WUR 430) may be a companion radio to a main (e.g., Wi-Fi) radio 510 (such as radio 114-1 or main radio 410) in interface circuit 412. WUR 512 may allow electronic device 110-1 to turn off (or otherwise reduce power to) main radio 510, e.g., whenever possible. Moreover, WUR 512 may wake up main radio 510 when wake-up frame 428, sent from optional WUR 514 or radio 516 (such as radio 114-2) in access point 112, specifies electronic device 110-1. Note that in some embodiments WUR 512 is configured to receive wireless signals, while main radio 510 is configured to transmit and to receive wireless signals. In these ways, the power consumption of WUR 512 may be very low, e.g., lower than Bluetooth Low Energy. In some other embodiments, WUR 512 may be configured to transmit and receive wireless signals, while still achieving a power savings. WUR 512 can operate in an always-on mode and/or in a duty-cycle mode. For example, in the duty-cycle mode, WUR 512 may turn on or listen for a wake-up frame from access point 112 based at least in part on a TWT schedule of electronic device 110-1. Alternatively or additionally, as described previously, WUR 512 may receive wake-up frame 428 between TWT SPs in the TWT schedule.

In some embodiments of the communication techniques, an urgency-level configuration may be defined for WUR-assisted data transmissions. The configurations may allow any/all of: a recipient electronic device (which is sometimes referred to as a 'station' or STA, and which is other than an access point) using a WUR to select the group addressed frames it receives; a recipient electronic device to adjust or optimize transmission delay or power consumption; and an access point to define a transmission technique for the frames. Note that multiple configurations may be ongoing at a time and that the traffic may be classified by: group address, TIDs, one or more ACs (such as voice, video, best effort and/or background) and/or Internet Protocol (IP) header type of service fields.

Moreover, as described previously, the WUR is a companion radio that has much lower power consumption in a receive state than the primary or main radio in the recipient electronic device. A recipient electronic device may be set or configured to be only available (or awakened) through a WUR. In this operating mode, an access point may transmit a wake-up frame or packet to the WUR to indicate that it has buffered downlink traffic intended for a recipient electronic device. When the recipient electronic device receives a wake-up frame, the recipient electronic device may selectively activate the main radio to receive the buffered downlink data.

As shown previously in FIG. 5, in a WUR-assisted data transmission, an access point may transmit a wake-up frame to a WUR in a recipient electronic device when it has buffered downlink traffic. When the recipient electronic device receives the wake-up frame, it may selectively turn on the main radio to be able to receive data transmissions from the access point.

Furthermore, it is often not clear whether an access point sends a wake-up frame when it has a group addressed frame to be transmitted. The communication techniques may allow the recipient electronic device and/or the access point to configure wake-up-frame transmission for group addresses and/or to specify delay performance. Without this configuration capability, a wake-up frame may need to be sent for every delivery traffic indication message (DTIM) beacon, which may result in similar power consumption for the main radio with and without a WUR. Additionally, the access point may often send a wake-up frame if it has a downlink individually addressed frame to be transmitted. The communication techniques may allow the recipient electronic device to configure how fast and for which individually addressed downlink frames a wake-up frame is to be transmitted. Note that the wake-up delay for delay-sensitive applications may be reduced and/or the power consumption of the recipient electronic device may be adjusted or improved.

In the communication techniques, the wake-up frequency and transmission delay may be configured according to the urgency of the downlink data. Therefore, an urgent frame may be received as soon as possible, or within a predetermined duration, to provide for good quality of experience (QoE). Moreover, a longer buffering time for non-urgent frames may increase the available payload size for the main radio transmissions, which may reduce transmission overheads and may increase the recipient electronic device bit/Joule efficiency. Note that the recipient electronic device may configure or define one or more urgency criteria or urgent data criteria (which are sometimes referred to as one or more 'data criteria' and, more generally, as one or more 'wake-up criteria') so that it is not awakened to receive a frame or packet unless it the frame or packet is classified as urgent. In this way, when the reception of a frame is not delay sensitive, it may be done when other traffic is transmitted, thereby improving the bit/Joule efficiency. Thus, in some embodiments, the recipient electronic device may not need to receive a frame immediately or at all.

Additionally, the data-urgency configuration may be performed during WUR-setup signaling (such as in a WUR-setup request from a recipient electronic device and a WUR-setup response from an access point, or during association between the recipient electronic device and the access point). The WUR may be setup to the default parameter values, and the recipient electronic device may signal the configurations that do not follow or that are different from the default values. Notably, the configuration of urgent data may be communicated between the access point and the recipient electronic device during the WUR-setup signaling. This WUR-setup signaling may be performed over or using the main radio. Typically, the recipient electronic device may propose the parameter(s) to define the urgent data and the parameters for the WUR operation. In response, the access point may acknowledge the parameter(s) and/or may modify the parameters, e.g., if they are not supported or if the access-point configuration does not allow such parameter values. For example, an access point may get WUR configuration requests from multiple recipient electronic devices and these requests may propose different configurations for the group-addressed frame transmissions. In these embodiments, in order to reduce the transmission overhead and the number of copies of the group-addressed data payload that are transmitted, the access point may arrange the requests to be served with the same group-addressed frame transmissions. Alternatively, if only a single recipient electronic device requests high urgency for a group addressed frame, the access point may transmit the group-addressed frame to the individual address of the requesting recipient electronic device. For data transmitted to the individual address of a recipient electronic device, the access point may consider the recipient electronic device subscription level, e.g., the level of performance (such as throughput, delay, supported applications, etc.) that the customer has subscribed for and may set the urgency levels accordingly. The access point may also monitor the quality-of-service (QoS) levels of the transmitted traffic and may avoid QoS inversions and violations by forcing the high-priority QoS-classified data packets to use higher-urgency classes. Thus, the access point may define the urgent-data criteria and the WUR data-transmission resources, operating channel, and address information of a wake-up frame.

A variety of main urgency levels for downlink frames may be used or defined. For example, a downlink frame may be configured with high urgency. In these embodiments, a recipient electronic device using a WUR may receive a wake-up frame immediately to wake up the main radio of the recipient electronic device to receive a high-priority frame. Alternatively, a downlink frame may be configured with low urgency. In these embodiments, a recipient electronic device using a WUR may receive a delayed wake-up frame to enable power adjusted or improved delivery of the low-priority traffic. Note that the delay of the wake-up frame transmission may be configurable. Moreover, a downlink frame may be configured with no urgency (or no urgency indication). In these embodiments, a wake-up frame may not be transmitted if the access point receives a frame. However, additional conditions may be set that result in transmission of a wake-up frame, such as based at least in part on the amount of buffered traffic. Furthermore, a recipient electronic device may receive individually addressed frames when it wakes up to receive other frames and/or a recipient electronic device using a WUR may miss the reception of a non-reported group addressed frame. In some embodiments, the recipient electronic device may use the frame-urgency classification to decide when it starts to obtain a transmission opportunity (TXOP) for its uplink frames. Note that using the same classification for uplink frames may enable the recipient electronic device to reduce the number of wake ups of the main radio.

In some embodiments, a recipient electronic device may define high-urgency data for which it desires to receive a wake-up frame as soon as the downlink data arrives at or is available from the access point. For other non-urgent data, the recipient electronic device may configure, e.g., two thresholds: a minimum or lower buffering time (which is the minimum time that an access point buffers the data before a wake-up frame is transmitted to the recipient electronic device, e.g., 0-4 s), and a maximum or upper buffering time (which is the maximum time that an access point may buffer the data that it receives and that is addressed to the recipient electronic device, e.g., 0.2-6 s). Note that the minimum buffering time is greater than or equal to zero and is less than or equal to the maximum buffering time.

The minimum and maximum buffering times may be used in low-urgency wake-up-frame transmission. For example, if enhanced distributed channel access (EDCA) is not used in the WUR, the minimum and maximum buffering delays may define a time interval during which the transmitter may select the transmission time for the first wake-up frame. However, if EDCA is used, the minimum buffering delay may define the time when the first wake-up frame is sent to the transmission buffer for channel access.

Note that the recipient electronic device and the access point may also have one or more other radios than a wireless local area network radio, such as and/all of: a Bluetooth radio, an LTE-license assisted access radio (as defined in 3GPP), a Zigbee radio, etc. In these embodiments, the one or more urgency criteria may be used to select the most-suitable radio access technology to transmit the traffic. For example, if only a little traffic is buffered, a recipient electronic device may use a Bluetooth radio.

Moreover, the one or more wake-up criteria for wake-up-frame transmission may be defined for no-urgency (non-urgent) unicast traffic (such as traffic that is predefined as non-urgent or that includes information that indicates that they are non-urgent). The target of the one or more wake-up criteria may be to ensure that access-point memory and buffering capability are not endangered by the buffering of no-urgency data. Notably, a threshold amount of buffered data for the recipient electronic device in the access point may be defined. The access point may send a wake-up frame if the access point has more than X media-access-control service data units (MSDUs) or more than X bytes of buffered data addressed to the recipient electronic device. (Note that X may be, e.g., a fraction of the available memory in the access point.) Alternatively or additionally, the total data buffers of the access point may not exceed a threshold. This wake-up criterion may not need to be configured. Instead, the access point may send a wake-up frame when this occurs. In some embodiments, a wake-up frame may be sent when there is buffered traffic from a threshold number of TIDs for the recipient electronic device. For example, the access point may send all buffered data in a single physical layer convergence procedure protocol data unit (PPDU) that reduces the operating time of the recipient electronic device.

A recipient electronic device may have multiple urgency criteria ongoing at the same time. For example, both the delay and the amount of buffered traffic criteria may be combined. Alternatively or additionally, logical operations (such as AND, XOR, NOR and/or OR) may combine multiple urgency criteria into a full set of urgency criteria for specifying one or more urgency levels for data. In some embodiments, a particular TID or AC may have its own rule set, such as: based at least in part on an amount of buffered traffic associated with a TID; and/or the minimum and/or maximum buffering delays.

Furthermore, default urgency-level settings may be defined. Notably, the default WUR urgency level for group-addressed frames may be 'no urgency'. A recipient electronic device may operate in a normal power saving mode and may wake up after each DTIM beacon to receive the group addressed frames, if it desires to receive them. Thus, a recipient electronic device may wake-up after a DTIM to receive the group addressed frames. Moreover, the default WUR urgency level for individually addressed frames may include that: frames in AC2 and AC3 are configured to high urgency; frames in AC1 are configured to low urgency; and frames in AC0 are configured to no urgency.

A variety of parameters may be used to map downlink frames to one or more urgency levels. Notably, an access point may map the downlink traffic to one or more urgency levels by using any/all of the following header fields. Individually addressed frames may use the type of service (ToS) field in IP headers and TID(s) or AC(s) in a MAC header to map or configure the urgent data. Additionally, traffic to/from specific IP address(es) and/or port number(s) may be used as parameters to configure the urgent data. Note that, in some embodiments, the group address may define the urgency level of a frame. Moreover, the group address may specify an application, a protocol, and/or a multicast stream. Note that each recipient electronic device may know which group-addressed frames it is listening to based at least in part on the ongoing applications (e.g., applications executing in the foreground and/or the background).

Figure 6:
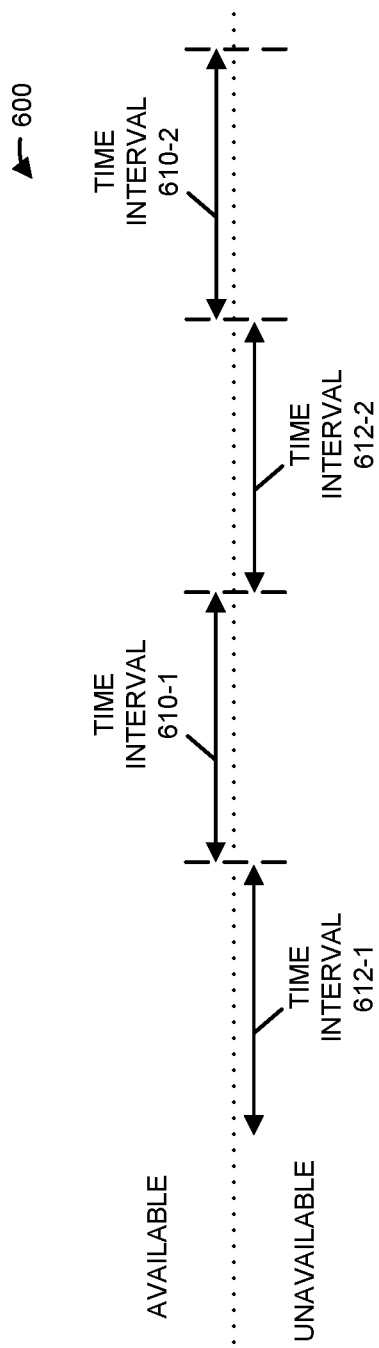
FIGS. 6 and 7 are drawings illustrating examples of communication between electronic devices, such as the electronic devices of FIG. 1.

Additionally, the WUR activity period may be defined or specified. Notably, a WUR may be configured to schedule the times when it is receiving via the channel. As shown in FIG. 6, which presents a drawing illustrating an example of communication 600 between electronic devices, wake-up frame may only be transmitted when the WUR is listening to the channel, e.g., during available time interval 610 and not during unavailable time intervals 612. For high-urgency unicast traffic, an access point may immediately transmit a wake-up frame. However, if a WUR has periodic availability, this may add delay to the transmitted wake-up frame. Moreover, for low-urgency unicast traffic, an access point may delay the wake-up-frame transmission, e.g., as agreed during the WUR-setup signaling.

In some embodiments, an access point may have one or more alternatives to sending a wake-up frame for group-addressed frames. For example, the access point may send a wake-up frame indicating the group address from which the main radio will send downlink frames and/or the access point may send a wake-up frame addressed to the individual address of the recipient electronic device that will receive the group addressed frames. These two alternatives are discussed further below.

Figure 7:
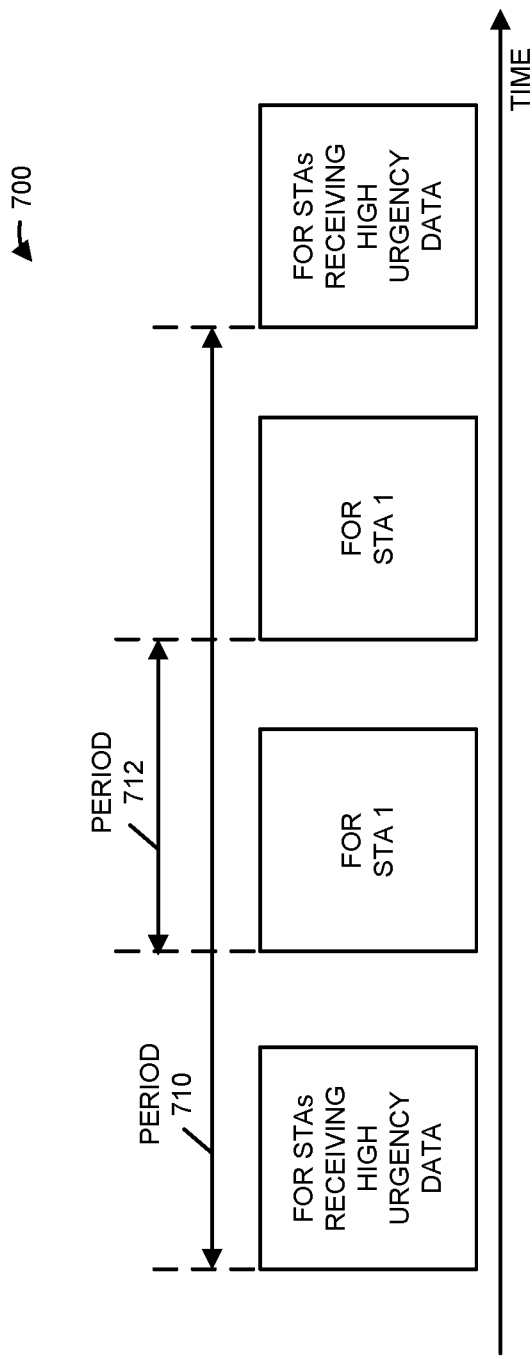

As shown in FIG. 7, which presents a drawing illustrating an example of communication 700 between electronic devices, a wake-up frame may be addressed to a multicast address. Notably, the access point may address a wake-up frame to the group address of the data frame transmitted by the main radio. Note that multiple recipient electronic devices may receive the wake-up frame addressed to the group address. In order to ensure that all receiving recipient electronic devices are available, the access point may: set the WUR of the receiving recipient electronic devices to have the same WUR availability period 710 (so that all the recipient electronic device are available at the same times); not allow the recipient electronic devices to use the WUR availability periodicity; and/or define a joint WUR period when all recipient electronic devices are to be available. In addition to this periodicity, each recipient electronic device may have its own period 712 when it is available. In some embodiments, the WUR periods of two or more devices may at least partially overlap.

An access point may assign a single group address that is used in a wake-up frame for a set of group addresses. Moreover, a recipient electronic device that is interested in receiving frames from any group address included in the set may wake up. The wake-up frame may have a configured bit-field that describes which addresses have traffic. In some embodiments, a value of, e.g., '1' in bit-field position 0 may indicate whether the frames from the first configured group address will be transmitted after the DTIM beacon. This may reduce the signaling overhead. In some embodiments, a shorter hash value (e.g., a 12-bit hash value) calculated from the group address may be used instead of the complete group address in the wake-up frame.

Moreover, individually addressed wake-up frames may be sent for multicast traffic. Notably, the access point may send one or more wake-up frames addressed to the individual address of a recipient electronic device that has setup high or low urgency to receive the frames addressed to the group address. The high or low-urgency signaling may be used to subscribe to the wake-up frames for specific group addressed frames. Note that each recipient electronic device may be awakened separately. One wake-up frame may be needed and, after the frame is buffered individually, the group addressed frames may be transmitted. In some embodiments, the recipient electronic devices may have their own WUR availability schedule. In these embodiments, the access point may delay the transmission of some wake-up frames to ensure that receivers are available to receive the wake-up frames.

Furthermore, in some implementations, wake-up frames may not be transmitted for no-urgency data frames. Notably, for the no-urgency frames, the access point may not transmit a wake-up frame to indicate the presence of the buffered frame. Instead, the buffered individual frame may be received when a recipient electronic device obtains other traffic. Note that there may be a configuration to send a wake-up frame if the buffered traffic exceeds a threshold or if the access point is running out of memory, e.g., because of the amount of buffered traffic. In some embodiments, the group addressed no-urgency frame(s) may be transmitted after the DTIM beacon and the recipient electronic device may not receive the frame(s).

In some embodiments, the communication techniques may be used for main-radio data delivery adjustment or optimization for WUR-assisted transmissions. Notably, in these embodiments, the main-radio operation may reduce the number of transmitted wake-up frames and may enable high-data transmission efficiency.

There may be a variety of main-radio groupcast frame-delivery adjustments and/or optimizations. Notably, an access point may transmit an additional high-urgency group-addressed frame, e.g., one main-radio activation delay after the wake-up frame is transmitted. This may ensure that the group-addressed-frame transmission delay is reduced or minimized. An access point may use a directed multicast service (DMS) to send an additional copy of the group-addressed frame immediately after the wake-up frame. DMS may specify the multicast addresses to which the access point may transmit individually addressed frames to the recipient electronic device. In this operation, the recipient electronic device may receive individually addressed copies of the transmitted group addressed frames. The one or more urgency or wake-up criteria may specify whether these group addressed frames that are transmitted to individual address of the recipient electronic device are urgent or non-urgent. Note that DMS can be used for low-urgency frames and/or high-urgency group addressed frames, e.g., that are important for the recipient electronic device to receive. The individually addressed groupcast frame may be configured to one of the urgency levels. By default, the high urgency level may be used.

Moreover, for low-urgency group-addressed frames, the access point may define a specific DTIM period after which the specific low-urgency group-addressed frames may be transmitted. Note that a flexible multicast service (FMS) may be used to setup and signal the DTIM period for the groupcast data transmission. In FMS, based at least in part on the group-addressed-frame urgency configurations, the access point may decide a specific DTIM periodicity for the group-addressed-frame transmissions. The WUR-setup signaling may define whether a wake-up frame is transmitted to indicate availability of the group-addressed frames after the specific DTIM interval. In some embodiments, if by default there will be group-addressed frames available, then no wake-up frame may be transmitted. In these embodiments, the wake-up frame may be transmitted if there are no group-addressed frames available after the DTIM beacon, or if the availability information of the frames changes, e.g., if the group-addressed frames were not transmitted after the previous DTIM beacon and a current DTIM beacon will contain the group-addressed frames, or vice versa.

In some embodiments, the no-urgency group-addressed frames may be transmitted after the random DTIM beacon. There may not be any delivery enhancement for these frames.

Furthermore, there may be one or more main-radio data-delivery adjustments or optimizations for unicast data. Notably, the communication techniques may be used to improve the power efficiency of the recipient electronic device using the WUR. For example, there may be a TWT agreement or schedule with one or more TWT SPs for main-radio uplink access. In a high-density environment, obtaining the uplink TXOP may take a long time and may consume a lot of energy. An TWT agreement with a long TWT SP interval may be used for non-urgent uplink data and/or downlink data in individually addressed frame transmissions. This may allow the non-urgent data to be collected and transmitted efficiently.

When a recipient electronic device gets uplink data to be transmitted, obtaining a TXOP may take a long time and may increase power consumption, especially at high density. Consequently, a first TWT agreement for uplink transmissions may be created (for transmission opportunities) with relatively frequent (e.g., 40-400 ms) repeating SPs. Note that the access point may not expect the recipient electronic device to be available during one or more (or any) of these TWT SPs. The established TWT may be an announced TWT, where an access point may transmit downlink data after it has received a power saving (PS)_Poll frame or a service period initiation frame, or the TWT SP may have a new type in which the access point may send a trigger frame to the recipient electronic device and may allocate transmission resources for a short uplink transmission. If nothing is transmitted in the allocated uplink resources, the access point may not retransmit the trigger frame. In some embodiments, the first TWT agreement may reduce the power consumption of the recipient electronic device and the uplink channel-access delay, especially at high density.

Alternatively, as described further below, a second TWT agreement may be used for non-urgent data transmissions. Notably, a recipient electronic device may create or specify an urgent-data configuration with an access point. If the access point receives downlink urgent data, it may send a wake-up frame as soon as possible. However, for non-urgent data delivery, the recipient electronic device and the access point may configure a TWT schedule with a long TWT SP interval (e.g., 1-10 s). Note that the recipient electronic device and the access point know when the non-urgent data is transmitted, and the data transmission can be prepared, which may increase the transmission efficiency. In some embodiments, the access point may assess the link performance of the recipient electronic device and/or the use of WUR signaling (such as one or more wake-up frames) may be reduced.

Additionally, the recipient electronic device and the access point may setup one or more wake-up criteria with an individual TWT agreement. Notably, a recipient electronic device may establish an individual TWT agreement with a long interval (e.g., 1-10 s) between TWT SPs. The TWT schedule can facilitate receiving and/or transmitting no-urgency data frames. The recipient electronic device may receive wake-up frames between TWT SPs for high-urgency and/or low-urgency data. Note that the high-urgency and/or low-urgency data may configure a duration to the next start time of a TWT SP, e.g., a threshold time until the start of the next TWT SP. If the duration to the next start time of a TWT SP is longer than this threshold, a wake-up frame may be transmitted. Moreover, the duration may be longer than the time needed to activate the transmitter.

Figure 8:
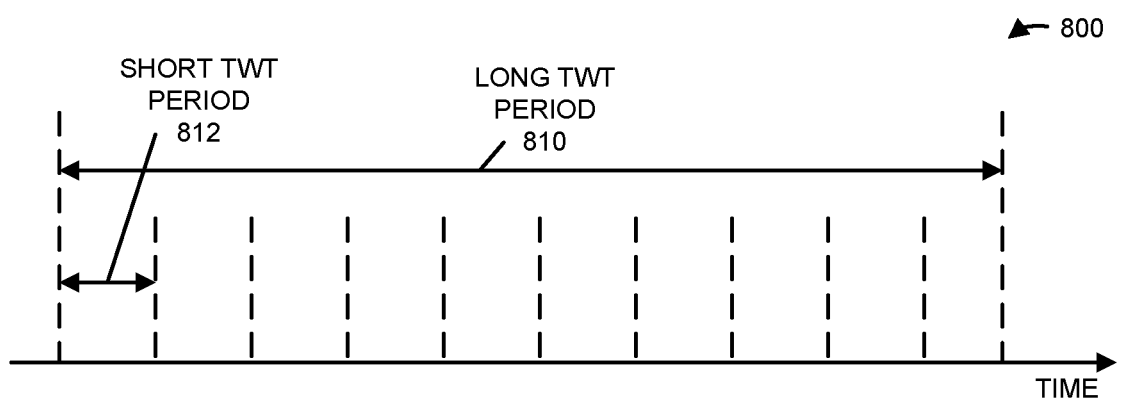
FIG. 8 is a drawing illustrating an example of TWT periodicity during communication between electronic devices, such as the electronic devices of FIG. 1.

In some embodiments, a recipient electronic device may have a first TWT agreement for faster uplink access for urgent data and a second TWT agreement for non-urgent data transmissions. Note that the urgent data may have very good delay performance, and the non-urgent data delivery may have reduced power consumption (or may be power improved or power optimized). As shown in FIG. 8, which presents a drawing illustrating an example of TWT periodicity during communication between electronic devices, a long TWT period 810 or SP interval may be used for uplink and downlink, while a short TWT period 812 or SP interval may only be used for uplink access, or transmission of downlink data during these TWT SPs may require that a frame is received during the TWT SP from the recipient electronic device.

In summary, the data-urgency configuration may configure group addresses from which the recipient electronic device receives traffic. Without the configuration, a WUR-enhanced recipient electronic device may have similar power consumption as a legacy recipient electronic device or it may not receive group addressed frames. Moreover, the urgent-data configuration may reduce the number of main-radio activations and/or may maintain good delay performance for urgent data. Furthermore, WUR-assisted data transmissions may be enhanced with a TWT agreement for uplink access, a TWT agreement for low-urgency and/or no-urgency uplink and/or downlink data, and/or DMS or FMS enhancements for group-addressed frames.

In some embodiments, a WUR and a main radio may be used in conjunction with the Internet of things (IoT) and/or automation applications, such as home lighting. In these embodiments, the main radio may be selected based at least in part on its wide availability in home networks and to enable end devices to directly connect with an electronic device, e.g., one or more lights. Moreover, the WUR may be used to reduce or minimize the power consumption (such as by LED lights) when the lighting is not in use. The lights may need to support one or more operations, including: service discovery (so that a new electronic device may find the lights and be able to communicate with them, e.g., within a few seconds delay); turn lights on/off; dimming one light, all the lights or a selected subset of the lights; provide commands to control the lights; and/or support maintenance (such as detecting that all systems are performing as expected or that maintenance is required (such as replacement), which may be a background operation with ongoing logging and a reduced or minimum delay).

Moreover, there may be many different delay requirements for the lights (or another similar electronic device). For example, a WUR may improve or maximize system performance by offering the delay and power adjusted or optimized operation for each supported operation.

A wake-up frame transmitted to the recipient electronic device may contain one or more bits indicating whether one or more urgent-data criteria has been met before the wake-up frame was transmitted. Alternatively, a bitmap of the one or more urgent-data criteria may be provided to the recipient electronic device. In some embodiments, an access point may send a wake-up frame to a recipient electronic device when it has buffered traffic for the recipient electronic device. The recipient electronic device may use the bit indication as to whether one or more urgent-data criteria have been met to decide whether it uses the main radio to receive data from the access point. Thus, the intelligence as to whether to wake up the main radio may be in the access point and/or in the recipient electronic device.

Furthermore, when a recipient electronic device gets a wake-up frame with urgent-data-criteria information, the recipient electronic device may decide whether it desires to wake-up immediately. This capability may allow the recipient electronic device to use knowledge of the type and amount of buffered data in decisions. Notably, the recipient electronic device may decide when it wakes up to receive the traffic and may reduce the number of wake-up operations. Note that, if the recipient electronic device has multiple radio connections ongoing, it may use the knowledge to select the appropriate radio access technology to wake up or to use for communication.

Figure 9:
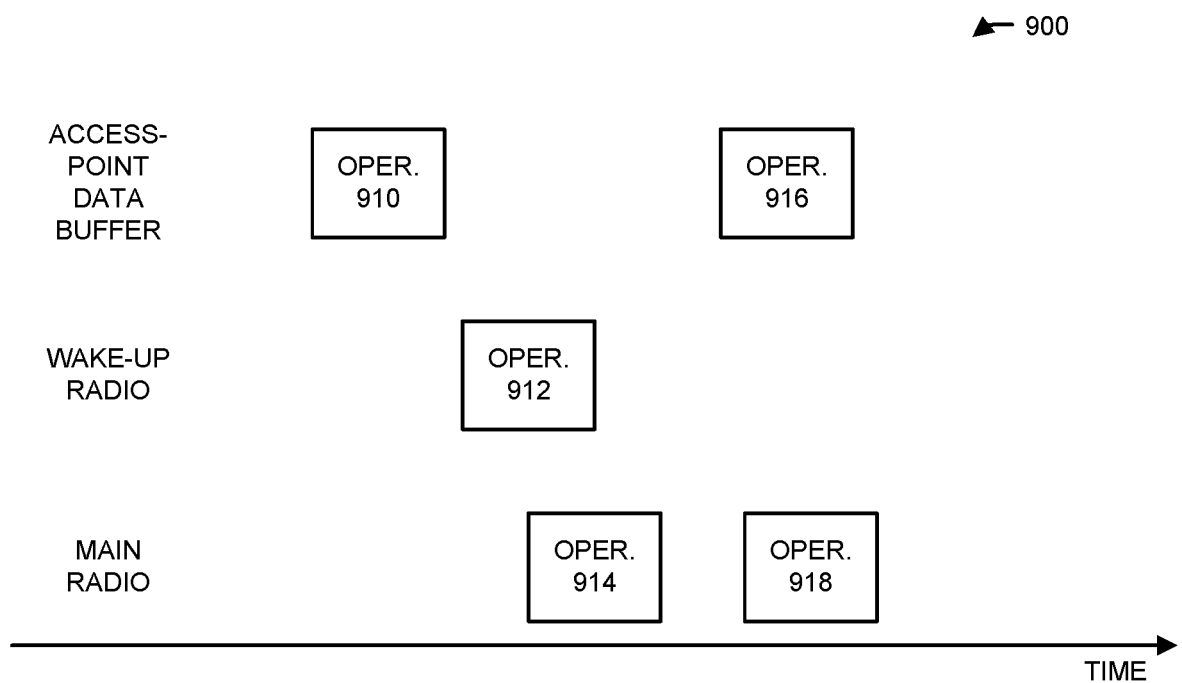
FIGS. 9-13 are timing diagrams illustrating examples of communication between electronic devices, such as the electronic devices of FIG. 1.

FIG. 9 presents a timing diagram illustrating an example of a high-urgency wake-up-frame transmission during communication 900 between electronic devices. In FIG. 9, at least one of the one or more urgent-data criteria are met and an immediate wake-up-frame transmission occurs. Notably, when data arrives at the access point, the access point checks the one or more urgent-data criteria and decides to transmit a wake-up frame immediately, e.g., as soon as possible (operation 910). After receiving the wake-up frame (operation 912), the recipient electronic device may wake up and use the main radio to fetch the data from the access point (operation 914). Then, the access point transmits the data to the recipient electronic device (operation 916), where it is received by the main radio (operation 918).

Figure 10:
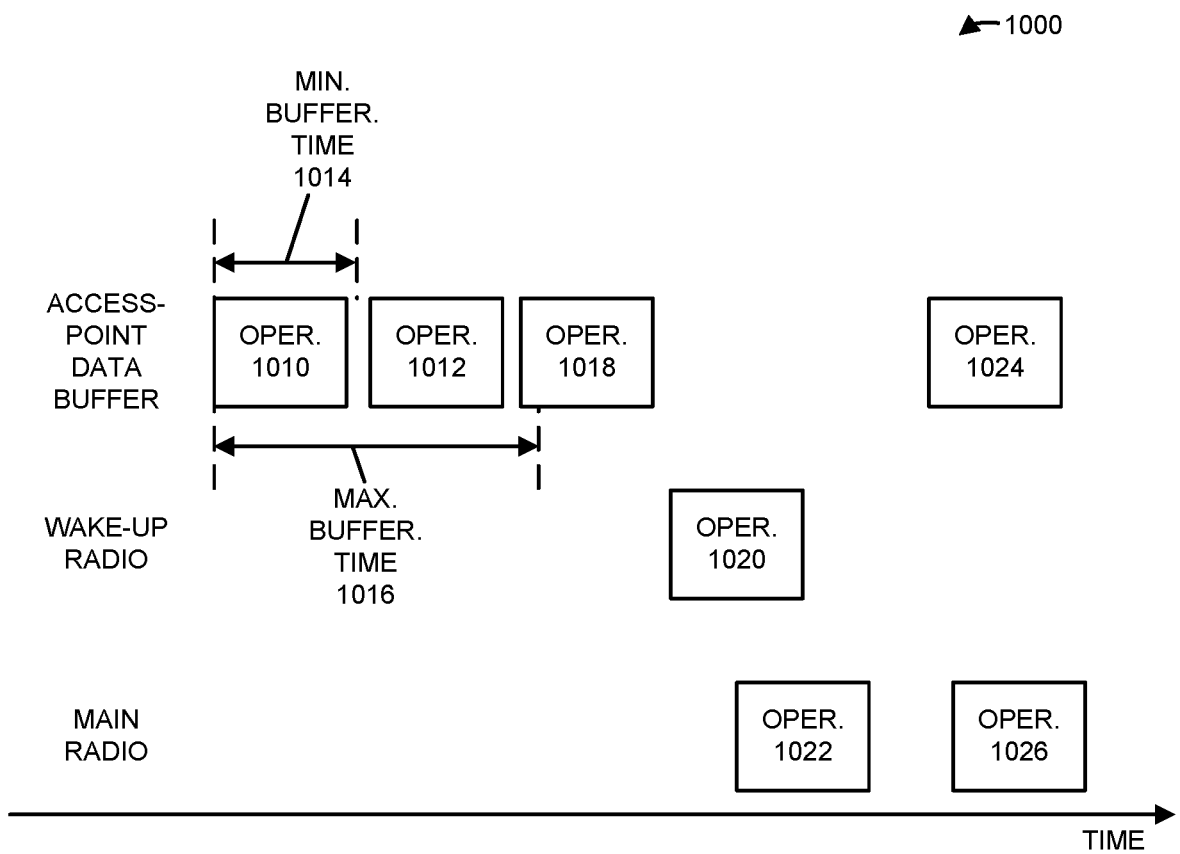

Alternatively, as shown in FIG. 10, which presents a timing diagram illustrating an example of a low-urgency wake-up-frame transmission during communication 1000 between electronic devices, in some embodiments at least one of the one or more urgent-data criteria is not met, and transmission of a wake-up frame is delayed. Notably, when data arrives at the access point, the access point checks the one or more urgent-data criteria and decides to wait before transmitting a wake-up frame (operation 1010). When additional data arrives (operation 1012) at the access point between the minimum and the maximum buffering times 1014 and 1016, the access point may check the coming multi-user downlink PPDU and uplink resources and select a wake-up-frame transmission time (operation 1018). After receiving the wake-up frame (1020), the recipient electronic device may wake up and use the main radio to fetch the data from the access point (operation 1022). Then, the access point transmits the data to the recipient electronic device (operation 1024), where it is received by the main radio (operation 1026).

Figure 11:
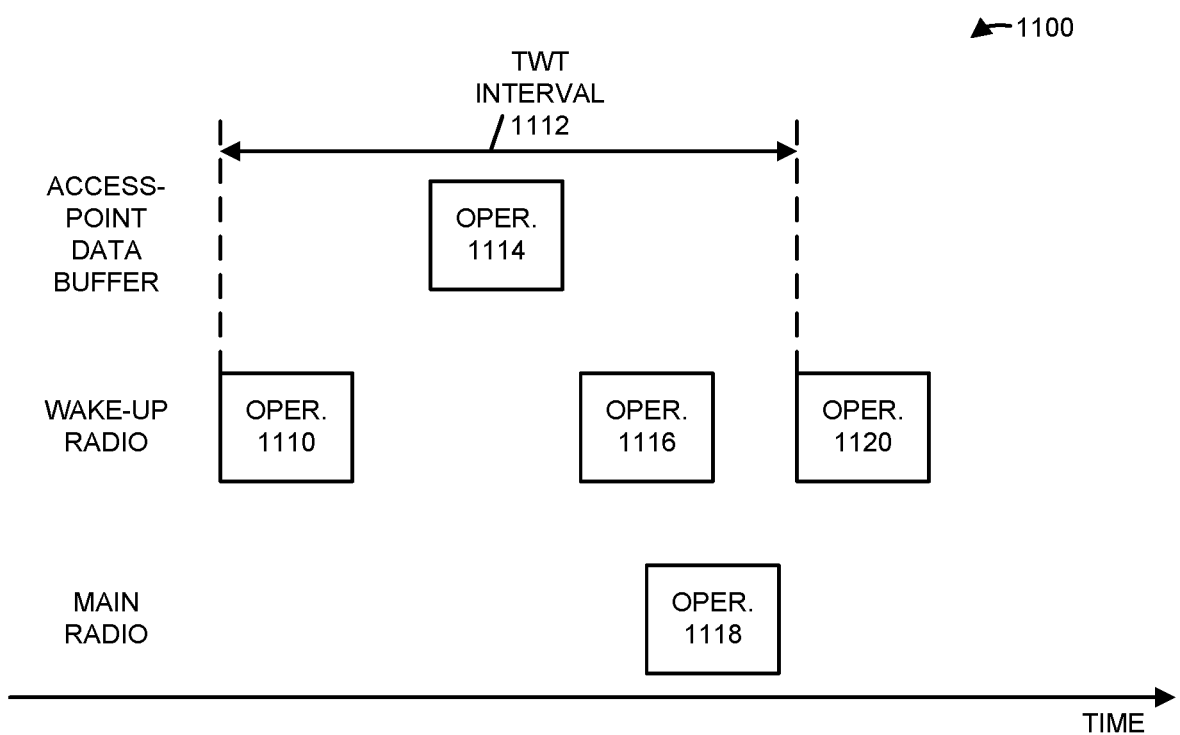

FIG. 11 presents a timing diagram illustrating an example of a high-urgency wake-up-frame transmission when a TWT for no-urgency data is ongoing during communication 1100 between electronic devices. In FIG. 11, transmission of a wake-up frame is delayed. Notably, the access point and the recipient electronic device may have established an individual TWT agreement that a TWT SP repeats (operation 1110) every TWT interval 1112. Then, when the access point receives data and uses the one or more urgent-data criteria to decide that the data is urgent (operation 1114), the access point may send a wake-up frame to wake up the recipient electronic device. In response, the recipient electronic device receives the wake-up frame (operation 1116) and activates the main radio to receive the data from the access point (operation 1118). Next, the recipient electronic device wakes up for the next TWT SP (operation 1120) or, optionally, the recipient electronic device may use suspend signaling to cancel the next TWT SP.

In some embodiments, an access point may consider the recipient electronic device as disassociated if the recipient electronic device does not transmit a frame to the access point within a beacon listening interval. Note that the association request frame may indicate the beacon listening interval.

Figure 12:
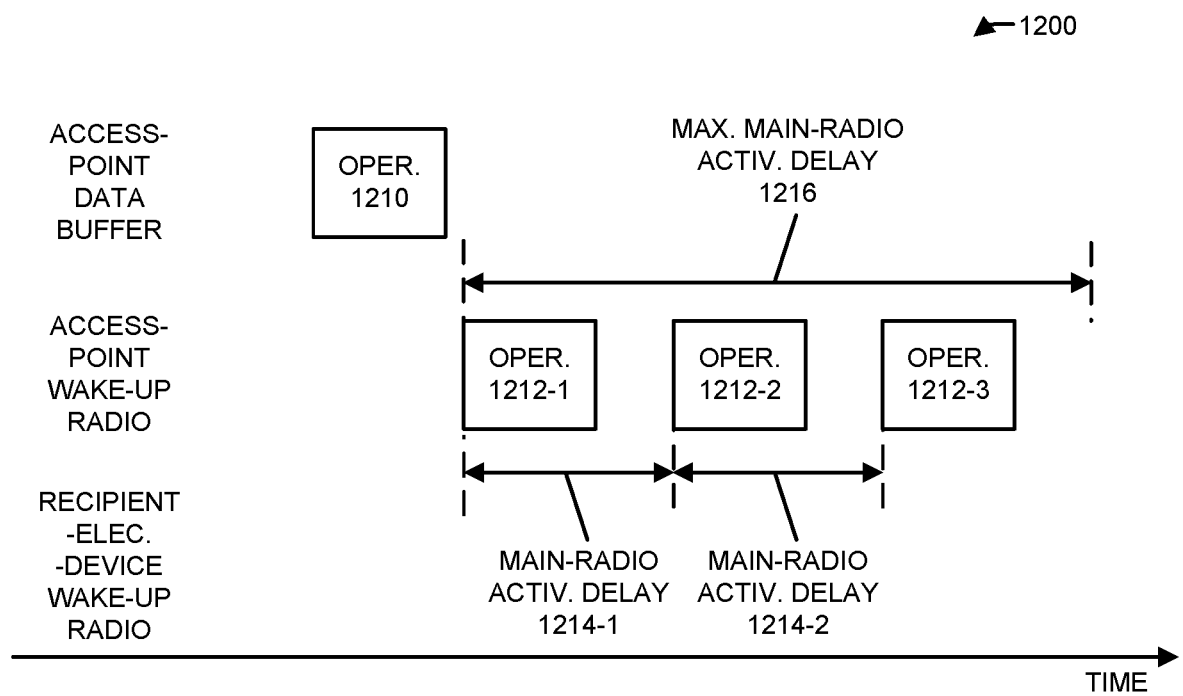

FIG. 12 presents a timing diagram illustrating an example of when a recipient electronic device using a WUR is disassociated by an access point during communication 1100 between electronic devices. Notably, the access point may receive data (operation 1210). Moreover, the access point may provide a lower or minimum number of wake-up-frame transmissions (operations 1212) before it considers the recipient electronic device as not present and thus disassociated. Note that each retransmission may occur with a reduced or minimum main-radio activation delay 1214 after the previous transmission, and the access point may increase the wake-up-frame retransmission delay in order to allow a recipient electronic device that has awakened to transmit a frame (to respond to a trigger or to obtain an uplink transmit opportunity by using EDCA). The access point may also have an upper or maximum main-radio activation delay 1216. If the recipient electronic device does not respond through the main radio within this delay, the access point may consider the recipient electronic device disassociated. The maximum main-radio activation delay (or length) may be the same as the listening interval in an association request, and both of these delays may be calculated or determined from the transmission of the first wake-up frame.

Figure 13:
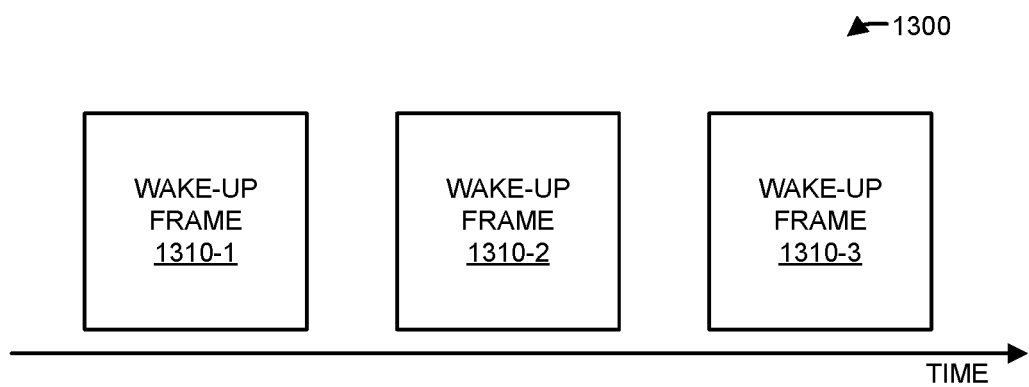

Moreover, as shown in FIG. 13, which presents a drawing illustrating an example of communication 1300 between electronic devices, transmission of a wake-up frame may include transmissions of multiple wake-up frames 1310 to the same recipient electronic device. In some embodiments, if, e.g., a 20 MHz preamble is transmitted to protect the wakeup frames, then EDCA may be used to obtain a transmit opportunity for the wake-up frames. However, if the wake-up frame is transmitted without a preamble, then EDCA may not need to be used. Notably, the recipient electronic device may not detect whether the 20 MHz channel is idle by assessing energy through a clear channel assessment (CCA), and the recipient electronic device may not receive at the channel in order to learn the ongoing transmissions and the virtual carrier sensing information, e.g., by detecting and maintaining a network allocation vector (NAV). In some embodiments, a recipient electronic device may initiate transmission at a random time it selected for transmission. Alternatively, the recipient electronic device may assess energy at the wake-up-frame transmission bandwidth and, if the assessed energy is below a threshold level, transmission may be allowed. Note that the access point may transmit multiple copies of the same wake-up frame in a single transmission burst (which may involve obtaining one EDCA transmission opportunity or performing a CCA of a smaller bandwidth at the beginning burst, while the following transmissions may be performed without any sensing, e.g., each transmission may be separated by short duration) in order to make it more likely that at least one of the wake-up frames is correctly received.

There may be several benefits for setting a TWT schedule and using the WUR between TWT SPs. For example, the signaling overhead through the WUR may be reduced. Moreover, during a TWT SP, the access point may ensure that the recipient electronic device is available. Furthermore, a recipient electronic device using a video-on-demand application may download content between constant time intervals and may maintain good delay performance for urgent data. Note that the recipient electronic device delay and/or the power consumption may be reduced.

We now describe embodiments of an electronic device. FIG. 14 presents a block diagram of an electronic device 1400 (which may be a cellular telephone, an access point, another electronic device, etc.) in accordance with some embodiments. This electronic device includes processing subsystem 1410, memory subsystem 1412, and networking subsystem 1414. Processing subsystem 1410 includes one or more devices configured to perform computational operations. For example, processing subsystem 1410 can include one or more microprocessors, application-specific integrated circuits (ASICs), microcontrollers, graphics processing units (GPUs), programmable-logic devices, and/or one or more digital signal processors (DSPs).

Memory subsystem 1412 includes one or more devices for storing data and/or instructions for processing subsystem 1410 and networking subsystem 1414. For example, memory subsystem 1412 can include dynamic random access memory (DRAM), static random access memory (SRAM), a read-only memory (ROM), flash memory, and/or other types of memory. In some embodiments, instructions for processing subsystem 1410 in memory subsystem 1412 include: program instructions or sets of instructions (such as program instructions 1422 or operating system 1424), which may be executed by processing subsystem 1410. For example, a ROM can store programs, utilities or processes to be executed in a non-volatile manner, and DRAM can provide volatile data storage, and may store instructions related to the operation of electronic device 1400. Note that the one or more computer programs may constitute a computer-program mechanism, a computer-readable storage medium or software. Moreover, instructions in the various modules in memory subsystem 1412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1410. In some embodiments, the one or more computer programs are distributed over a network-coupled computer system so that the one or more computer programs are stored and executed in a distributed manner.

In addition, memory subsystem 1412 can include mechanisms for controlling access to the memory. In some embodiments, memory subsystem 1412 includes a memory hierarchy that comprises one or more caches coupled to a memory in electronic device 1400. In some of these embodiments, one or more of the caches is located in processing subsystem 1410.

In some embodiments, memory subsystem 1412 is coupled to one or more high-capacity mass-storage devices (not shown). For example, memory subsystem 1412 can be coupled to a magnetic or optical drive, a solid-state drive, or another type of mass-storage device. In these embodiments, memory subsystem 1412 can be used by electronic device 1400 as fast-access storage for often-used data, while the mass-storage device is used to store less frequently used data.

Figure 14:
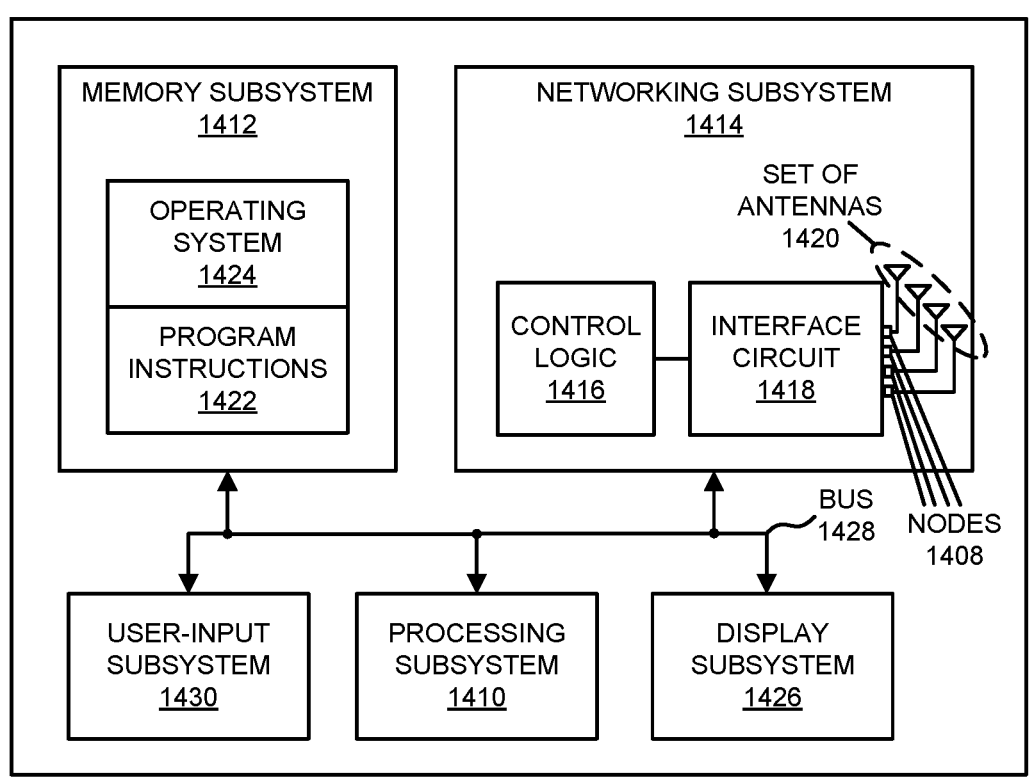
FIG. 14 is a block diagram illustrating an example of one of the electronic devices of FIG. 1.

Networking subsystem 1414 includes one or more devices configured to couple to and communicate on a wired and/or wireless network (i.e., to perform network operations), including: control logic 1416, an interface circuit 1418 and a set of antennas 1420 (or antenna elements) in an adaptive array that can be selectively turned on and/or off by control logic 1416 to create a variety of optional antenna patterns or 'beam patterns.' (While FIG. 14 includes set of antennas 1420, in some embodiments electronic device 1400 includes one or more nodes, such as nodes 1408, e.g., a pad, which can be coupled to set of antennas 1420. Thus, electronic device 1400 may or may not include set of antennas 1420.) For example, networking subsystem 1414 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, networking subsystem 1414 includes one or more radios, such as a WUR that is used to receive wake-up frames, and a main radio that is used to transmit and/or receive frames or packets during a higher-power mode. The WUR and the main radio may be implemented separately (such as using discrete components or separate integrated circuits) or in a common integrated circuit.

Networking subsystem 1414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1400 may use the mechanisms in networking subsystem 1414 for performing simple wireless communication between the electronic devices, e.g., transmitting advertising or frame frames and/or scanning for advertising frames transmitted by other electronic devices.

Within electronic device 1400, processing subsystem 1410, memory subsystem 1412, and networking subsystem 1414 are coupled together using bus 1428 that facilitates data transfer between these components. Bus 1428 may include an electrical, optical, and/or electro-optical connection that the subsystems can use to communicate commands and data among one another. Although only one bus 1428 is shown for clarity, different embodiments can include a different number or configuration of electrical, optical, and/or electro-optical connections among the sub systems.

In some embodiments, electronic device 1400 includes a display subsystem 1426 for displaying information on a display, which may include a display driver and the display, such as a liquid-crystal display, a multi-touch touchscreen, etc. Display subsystem 1426 may be controlled by processing subsystem 1410 to display information to a user (e.g., information relating to incoming, outgoing, or an active communication session).

Electronic device 1400 can also include a user-input subsystem 1430 that allows a user of the electronic device 1400 to interact with electronic device 1400. For example, user-input subsystem 1430 can take a variety of forms, such as: a button, keypad, dial, touch screen, audio input interface, visual/image capture input interface, input in the form of sensor data, etc.

Electronic device 1400 can be (or can be included in) any electronic device with at least one network interface. For example, electronic device 1400 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1400, in alternative embodiments, different components and/or subsystems may be present in electronic device 1400. For example, electronic device 1400 may include one or more additional processing subsystems, memory subsystems, networking subsystems, and/or display subsystems. Additionally, one or more of the subsystems may not be present in electronic device 1400. Moreover, in some embodiments, electronic device 1400 may include one or more additional subsystems that are not shown in FIG. 14. Also, although separate subsystems are shown in FIG. 14, in some embodiments some or all of a given subsystem or component can be integrated into one or more of the other subsystems or component(s) in electronic device 1400. For example, in some embodiments program instructions 1422 are included in operating system 1424 and/or control logic 1416 is included in interface circuit 1418.

Moreover, the circuits and components in electronic device 1400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1414. This integrated circuit may include hardware and/or software mechanisms that are used for transmitting wireless signals from electronic device 1400 and receiving signals at electronic device 1400 from other electronic devices. Aside from the mechanisms herein described, radios are generally known in the art and hence are not described in detail. In general, networking subsystem 1414 and/or the integrated circuit can include any number of radios. Note that the radios in multiple-radio embodiments function in a similar way to the described single-radio embodiments.

In some embodiments, networking subsystem 1414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1422, operating system 1424 (such as a driver for interface circuit 1418) or in firmware in interface circuit 1418. Alternatively or additionally, at least some of the operations in the communication techniques may be implemented in a physical layer, such as hardware in interface circuit 1418. In some embodiments, the communication techniques are implemented, at least in part, in a MAC layer and/or in a physical layer in interface circuit 1418.

While examples of numerical values are provided in the preceding discussion, in other embodiments different numerical values are used. Consequently, the numerical values provided are not intended to be limiting.

While the preceding embodiments illustrated the use of a WUR-setup request, a WUR-setup response and a wake-up frame that are communicated using Wi-Fi, in other embodiments of the communication techniques Bluetooth Low Energy is used to communicate one or more of these frames or packets. Furthermore, the WUR-setup request, the WUR-setup response and/or the wake-up frame may be communicated in the same or a different band of frequencies that the band(s) of frequencies used by the main radio. For example, the WUR-setup request, the WUR-setup response and/or the wake-up frame may be communicated in one or more bands of frequencies, including: 900 MHz, 2.4 GHz, 5 GHz, 60 GHz, and/or a band of frequencies used by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a node configured to communicatively couple to an antenna; and
an interface circuit, communicatively coupled to the node, configured to communicate with a recipient electronic device, and configured to:
receive, from the node, a wake-up-radio (WUR)-setup request associated with the recipient electronic device, wherein the WUR-setup request specifies one or more proposed wake-up criteria that indicate when a wake-up frame is to be transmitted to the recipient electronic device, wherein at least one of the one or more proposed wake-up criteria corresponds to a logical combination of a buffering delay and an amount of buffered data in the electronic device, and wherein the logical combination is based at least in part on a logical operation; and
provide, to the node, a WUR-setup response intended for the recipient electronic device, wherein the WUR-setup response indicates acceptance of the one or more proposed wake-up criteria as one or more selected wake-up criteria for use, indicates a proposed modification of at least one of the one or more proposed wake-up criteria, or both.

2. The electronic device of claim 1, wherein the electronic device is configured to determine the one or more selected wake-up criteria that indicate when the wake-up frame is to be transmitted to the recipient electronic device based at least in part on the one or more proposed wake-up criteria.

3. The electronic device of claim 1, wherein the interface circuit is configured to provide, to the node, the wake-up frame intended for the recipient electronic device based at least in part on the one or more selected wake-up criteria.

4. The electronic device of claim 3, wherein the wake-up frame comprises information specifying at least a subset of the one or more selected wake-up criteria that were met prior to the interface circuit providing the wake-up frame.

5. The electronic device of claim 1, wherein the interface circuit is configured to receive, from the node, a second WUR-setup response associated with the recipient electronic device; and
wherein the second WUR-setup response indicates acceptance by the recipient electronic device of the proposed modification of the at least one of the one or more proposed wake-up criteria.

6. The electronic device of claim 1, wherein the wake-up frame indicates that a main radio in the recipient electronic device is to transition from a lower-power mode to a higher-power mode.

7. The electronic device of claim 1, wherein the interface circuit is configured to provide, to the node, a frame that indicates a targeted-wake-up-time (TWT) schedule for the recipient electronic device; and
wherein the wake-up frame is used to wake up the recipient electronic device between TWT service periods (SPs) in the TWT schedule.

8. The electronic device of claim 7, wherein the TWT schedule comprises a first TWT service period (SP) interval for uplink traffic from the recipient electronic device and a second TWT SP interval for downlink traffic to the recipient electronic device.

9. The electronic device of claim 1, wherein the one or more selected wake-up criteria comprise at least one of: an amount of buffered data for the recipient electronic device, an amount of buffered data associated with at least a traffic identifier, an amount of buffered data associated with at least an access category, a group address that the recipient electronic device receives, a priority level of buffered data for the recipient electronic device, address information of buffered data for the recipient electronic device, buffered data associated with a threshold number of traffic identifiers for the recipient electronic device, total buffered data in the access point and a threshold buffered data value, buffered data addressed to one or more multicast addresses, a minimum buffering delay, or a maximum buffering delay.

10. The electronic device of claim 1, wherein at least one of the one or more selected wake-up criteria for a first group address differs from at least one of the one or more selected wake-up criteria for a second group address.

11. The electronic device of claim 1, wherein the interface circuit is configured to provide, to the node, the wake-up frame intended for the recipient electronic device based at least in part on the one or more selected wake-up criteria, and the wake-up frame is addressed to a group address.

12. The electronic device of claim 1, wherein the interface circuit is configured to provide, to the node, the wake-up frame intended for the recipient electronic device based at least in part on the one or more selected wake-up criteria, and the wake-up frame is addressed only to the recipient electronic device when the wake-up frame has a predefined urgency.

13. A non-transitory computer-readable storage medium for use in conjunction with an electronic device, the computer-readable storage medium storing a program module that, when executed by the electronic device, causes the electronic device to provide a wake-up-radio (WUR) response by carrying out one or more operations comprising:
receiving, at an interface circuit in the electronic device, a WUR-setup request associated with a recipient electronic device, wherein the WUR-setup request specifies one or more proposed wake-up criteria that indicate when a wake-up frame is to be transmitted to the recipient electronic device, wherein at least one of the one or more proposed wake-up criteria corresponds to a logical combination of a buffering delay and an amount of buffered data in the electronic device, and wherein the logical combination is based at least in part on a logical operation; and
providing, from the interface circuit, the WUR-setup response intended for the recipient electronic device, wherein the WUR-setup response indicates acceptance of the one or more proposed wake-up criteria as one or more accepted wake-up criteria or a proposed modification of at least one of the one or more proposed wake-up criteria.

14. The computer-readable storage medium of claim 13, wherein the one or more operations comprise determining the one or more accepted wake-up criteria that indicate when the wake-up frame is to be transmitted to the recipient electronic device based at least in part on the one or more proposed wake-up criteria.

15. The computer-readable storage medium of claim 13, wherein the one or more operations comprise providing, from the interface circuit, the wake-up frame intended for the recipient electronic device based at least in part on the one or more accepted wake-up criteria.

16. The computer-readable storage medium of claim 15, wherein the wake-up frame comprises information specifying at least a subset of the one or more accepted wake-up criteria that were met prior to the interface circuit providing the wake-up frame.

17. The computer-readable storage medium of claim 13, wherein the one or more operations comprise receiving, at the interface circuit, a second WUR-setup response associated with the recipient electronic device; and
wherein the second WUR-setup response indicates acceptance by the recipient electronic device of the proposed modification of the at least one of the one or more proposed wake-up criteria.

18. A method for generating a wake-up-radio (WUR) response, comprising:
receiving, at an interface circuit, a WUR-setup request associated with a recipient electronic device, wherein the WUR-setup request specifies one or more proposed wake-up criteria that indicate when a wake-up frame is to be transmitted to the recipient electronic device, wherein at least one of the one or more proposed wake-up criteria corresponds to a logical combination of a buffering delay and an amount of buffered data in the electronic device, and wherein the logical combination is based at least in part on a logical operation; and
generating, from the interface circuit, the WUR-setup response intended for the recipient electronic device, wherein the WUR-setup response indicates acceptance of the one or more proposed wake-up criteria as one or more accepted wake-up criteria or a proposed modification of at least one of the one or more proposed wake-up criteria.

19. The method of claim 18, wherein the method comprises determining the one or more accepted wake-up criteria that indicate when the wake-up frame is generated for the recipient electronic device based at least in part on the one or more proposed wake-up criteria.

20. The method of claim 18, wherein the wake-up frame comprises information specifying at least a subset of the one or more accepted wake-up criteria that were met prior to the interface circuit generating the wake-up frame.

* * * * *